(12) United States Patent
Zuckerman et al.

(10) Patent No.: US 8,794,466 B2
(45) Date of Patent: Aug. 5, 2014

(54) METHOD AND DEVICE FOR ESTABLISHING DESIRED PROPORTIONS OF WATER AND COFFEE BEANS TO MAKE A COFFEE BEVERAGE

(76) Inventors: Mark Zuckerman, South Pasadena, CA (US); Frank Zuckerman, San Rafael, CA (US); Jack Martin, Calistoga, CA (US)

( * ) Notice: Subject to any disclaimer, the term of this patent is extended or adjusted under 35 U.S.C. 154(b) by 0 days.

(21) Appl. No.: 13/544,056

(22) Filed: Jul. 9, 2012

(65) Prior Publication Data
US 2014/0008362 A1    Jan. 9, 2014

(51) Int. Cl.
*B65D 21/02* (2006.01)
*A47G 19/00* (2006.01)

(52) U.S. Cl.
USPC ..... 220/23.83; 220/4.26; 220/4.27; 220/23.2; 220/23.4; 220/661

(58) Field of Classification Search
USPC ......... 220/4.01, 4.26, 4.27, 23.2, 23.4, 23.83, 220/23.86, 661, 676, 737, 741, 752; 99/323
See application file for complete search history.

(56) References Cited

U.S. PATENT DOCUMENTS

| | | | |
|---|---|---|---|
| 244,138 A | 7/1881 | Gantt | |
| 898,701 A | 9/1908 | Tate | |
| 2,712,396 A | 7/1955 | Mowat | |
| D220,864 S | * 6/1971 | Weckman | D9/741 |
| 4,293,008 A | 10/1981 | Coleman | |
| 4,483,455 A | * 11/1984 | Prophet et al. | 220/23.83 |
| 4,721,393 A | 1/1988 | Kwast | |
| 4,762,251 A | 8/1988 | Berger | |
| 5,375,742 A | 12/1994 | Mowry | |
| 5,406,995 A | 4/1995 | Gantzer | |
| D361,532 S | 8/1995 | North, III et al. | |
| 5,447,245 A | * 9/1995 | Merhar | 215/6 |
| 5,758,540 A | 6/1998 | Davila et al. | |
| D431,478 S | 10/2000 | Fortier | |
| 6,382,452 B1 | * 5/2002 | Getachew et al. | 220/524 |
| 6,494,129 B2 | 12/2002 | Lin | |
| 6,949,190 B2 | * 9/2005 | Hutzler | 210/248 |
| 7,472,595 B2 | * 1/2009 | Ploix | 73/426 |
| 2001/0030191 A1 | * 10/2001 | Bopp et al. | 220/23.4 |
| 2005/0161424 A1 | * 7/2005 | Hogan | 215/10 |
| 2007/0062939 A1 | * 3/2007 | Davis et al. | 220/23.2 |
| 2007/0215617 A1 | * 9/2007 | Lowance | 220/23.83 |

* cited by examiner

*Primary Examiner* — Fenn Mathew
*Assistant Examiner* — Madison L Poos
(74) *Attorney, Agent, or Firm* — Risso & Associates

(57) ABSTRACT

Described is a device for establishing desired proportions of water and coffee beans. The device includes a fluid vessel and a laterally attached coffee solid vessel. The fluid vessel has vertical height and a fluid volume capacity, with the fluid vessel being formed to hold water therein. The coffee solid vessel has vertical height and an interior that defines a coffee solid volume capacity, with the coffee solid vessel being formed to hold a solid coffee product therein. Importantly, each of the fluid vessel and coffee solid vessel are formed such that a desired solid-to-fluid ratio exists between the fluid volume capacity and the coffee solid volume capacity when laterally attached with one another, with the desired solid-to-fluid ratio being maintained along the vertical height of each of the vessels (which can be readily verified through a visual inspection of the horizontal equality of contents).

8 Claims, 4 Drawing Sheets

METHOD AND DEVICE FOR ESTABLISHING DESIRED PROPORTIONS OF WATER AND COFFEE BEANS TO MAKE A COFFEE BEVERAGE

BACKGROUND OF THE INVENTION (1) Field of Invention

The present invention relates to a measuring device and, more particularly, to a measuring device for establishing desired proportions of water and coffee beans to make a coffee beverage.

(2) Description of Related Art

This invention generally relates to the method or process for making a coffee beverage. At the outset, it should be explained that the word "coffee" normally has two different meanings. The first definition is that coffee is a beverage consisting of a decoction or infusion of roasted ground or crushed seeds (coffee beans) in water. The second definition is that the roasted coffee beans, whether ground or crushed, are also called coffee. As used herein, the word "coffee", will be used to describe the finished drinkable beverage. When the term "bean" is used, it will be referring to the solid coffee bean material and can be used interchangeably with the term "solid coffee product." The term "bean" or "solid coffee product", in most practical application, is provided in granular, whole beans, ground beans, or similar solid particulate condition; however, the terms do not apply to a coffee solid identified as being for 'instant' brewing preparation.

The strength of the coffee is determined by the proportion of the volume of bean to the volume of the water, irrespective of whether the coffee is made using various brewing methodologies, such as percolation, dripping, steeping, French-pressing or other well known methods of having the bean and water coming into contact. The higher the bean-to-water ratio by volume, the stronger the resulting coffee will be. As this ratio decreases, the coffee becomes weaker.

Individuals, as well as large volume purveyors of coffee, such as restaurants and coffee shops, are generally aware that the bean/water relationship is significant in the coffee beverage process. The specific instructions and standards for such relationship have typically been expressed in tablespoons of coffee beans (powder or the like) "per cup" or to "fluid ounces" of water. Notwithstanding the desirability of such standards, there has been no simple non-calculating system for conforming to any such standard. Instead, existing systems include specific instructions such as "for 'x' cups of water, add 'y' tablespoons of beans", or "for 'x' ounces of water", add 'y' scoops of beans." With such instructions, it is unlikely (or, it is difficult to assure) that successive batches of coffee will have the same strength and characteristics.

Heretofore, systems have been devised for visually indicating the volume of one fluid in a particular proportion to a second fluid prior to the mixing of the two fluids. Oddly enough, and notwithstanding the fact that a large percentage of American and European persons regularly make and drink coffee, there is no comparable system for reliably establishing a volume of a dried product, such as coffee beans, in a predetermined volumetric relationship percentage to a volume of liquid, such as water, prior to having the wet and dry products coming into contact.

Thus, a continuing need exists for an invention that provides a simple and fool-proof method for determining the volumetric proportions of beans to water to ultimately provide a desired strength of coffee.

SUMMARY OF INVENTION

The present invention relates to a device for establishing desired proportions of water and coffee beans. The device includes a fluid vessel and a coffee solid vessel. The fluid vessel has vertical height and a fluid volume capacity, with the fluid vessel being formed to hold water therein. The coffee solid vessel is laterally attached with the fluid vessel. The coffee solid vessel has vertical height and an interior that defines a coffee solid volume capacity, with the coffee solid vessel being formed to hold a solid coffee product therein. Importantly, each of the fluid vessel and coffee solid vessel are formed such that a desired solid-to-fluid ratio exists between the fluid volume capacity and the coffee solid volume capacity when laterally attached with one another, with the desired solid-to-fluid ratio being maintained along the vertical height of each of the vessels. Thus, a user can fill the fluid vessel with water to any point along the vertical height and fill the coffee solid vessel with solid coffee product such that the solid coffee product is approximately level with the water, and in doing so, establish desired proportions of water and solid coffee product.

In another aspect, the coffee solid volume capacity is approximately one sixth the fluid volume capacity, such that a ratio of one to six exists between the coffee solid volume capacity and fluid volume capacity at any and all points along the vertical height.

In yet another aspect, the coffee solid vessel includes a drain formed therethrough to allow fluid in the coffee solid vessel to drain therefrom.

In another aspect, the drain includes a series of perforations formed through the coffee solid vessel. The series of perforations are formed at upward slanting angles such that the perforations pass upward from the interior of the coffee solid vessel to an exterior of the coffee solid vessel, whereby due to the upward slanting angles, coffee solid positioned within the coffee solid vessel is maintained therein, while fluid is allowed to escape through the perforations.

In another aspect, the coffee solid vessel is detachably attached with the fluid vessel. For example, a handle extends from the fluid vessel, the handle having an upper platform and a lower platform. Each of the upper platform and lower platform have a hole formed therethrough, with the holes formed to accommodate the coffee solid vessel therein, thereby allowing a user to position the coffee solid vessel within the holes and attach the coffee solid vessel with the fluid vessel.

In yet another aspect, each of the coffee solid vessel and fluid vessel are formed in a frustrum shape.

Alternatively, the fluid vessel is generally cylindrically shaped, with a pie-shape cut-out along its vertical length. In this aspect, the coffee solid vessel is formed to have a wedge-shaped cross section that allows the coffee solid vessel to matingly engage with the fluid vessel by fitting within the pie-shape cut-out of the fluid vessel.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
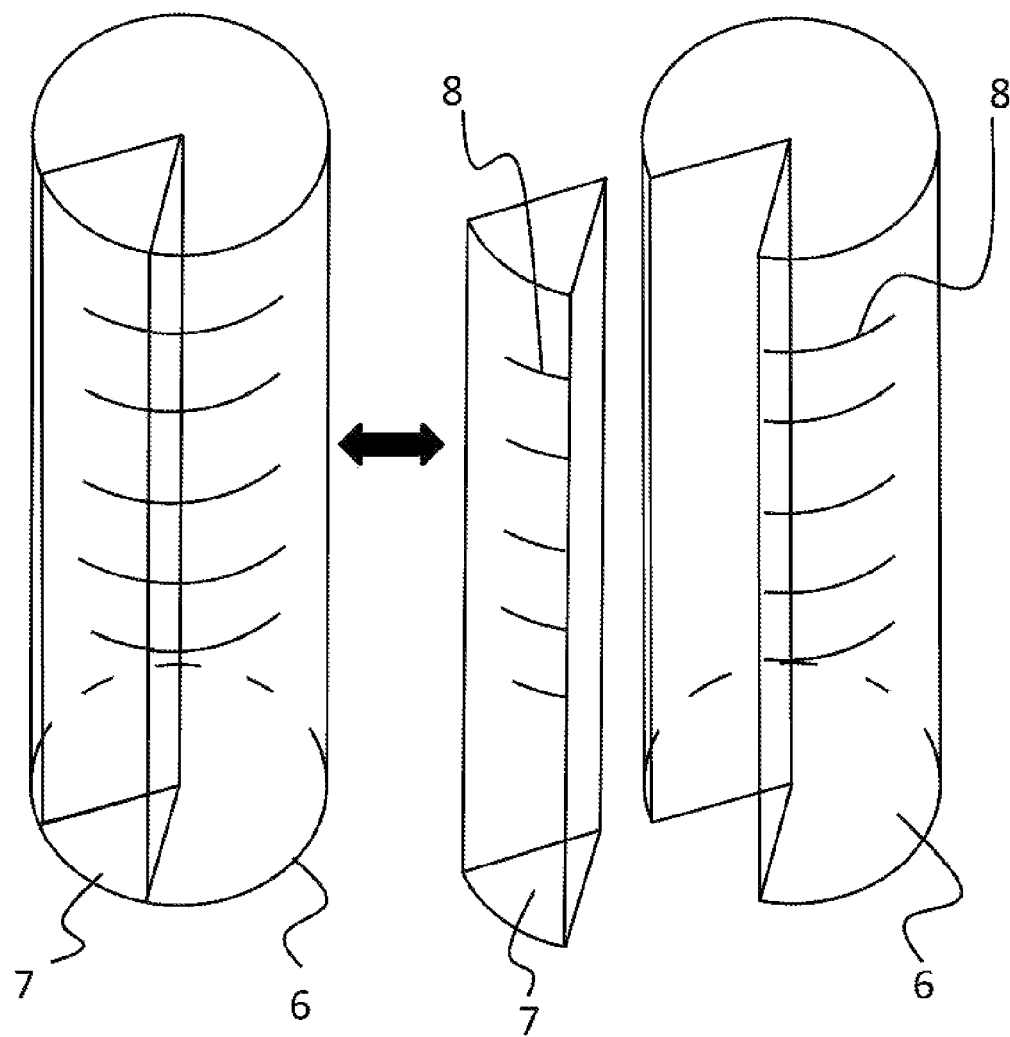
FIG. 1 is a perspective-view illustration of a fluid vessel and coffee solid vessel according to the present invention.

The present invention relates to a measuring device and, more particularly, to a measuring device for establishing desired proportions of water and coffee beans to make a coffee beverage. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Introduction

As noted above, the present invention is directed to a measuring device for establishing desired proportions of water and coffee beans (coffee solid product) to make a coffee beverage. Generally speaking, the invention includes separate and adjacent viewable vessels (chambers) for the beans and the water with the respective volumetric size of each chamber being proportionate to the desired proportion of the beans to coffee. After the respective vessels have been filled to the same height with the beans and water, the beans and water can be applied to any suitable coffee brewing apparatus to bring the solids and liquid together using any well known coffee making process. It should be noted that the term "beans" and "coffee solid product" can be used interchangeably and refer to coffee beans in granular, whole bean, ground bean, or similar solid particulate condition.

Thus, it is an objective of the invention to provide a measuring system for beans and water in which the proper relationship of beans and water may be easily determined by visual observation irrespective of the volume of the resulting coffee, e.g., whether the resulting coffee will consist of one cup or six and one-third cups. As such, a simple visual inspection of the horizontal equality of contents is all that is necessary to assure a consistently obtained, and properly proportioned, ratio of water to coffee solids.

While this invention is disclosed in connection with making of coffee, it should be understood that the method is applicable to other solid state material intended to come into contact with a liquid in a particular volumetric proportion so as to provide a specific strength ratio of solids to liquid. By way of example, tea leaves and water or solid sugar particles and a liquid, such as water, a coffee beverage, a tea beverage, or the like. Specific details regarding the present invention are provided below.

(2) Specific Details

As explained above, in carrying out the process of the present invention, generally, one first determines the desired volume of the coffee beverage which will be subsequently made. By way of example, a generally accepted Coffee Brewer's Institute recipe calls for two level tablespoons of coffee beans for every six ounces of water. Converting ounces of water to a volumetric measure, the relationship equates to a bean to water ratio of 1:6. Assuming that the 1-to-6 ratio is desired, it is then necessary to take a volume of water generally equal to the desired volume of the finished coffee beverage and a volume of coffee beans equal to one-sixth of the volume of water. Obviously, if a stronger or weaker coffee is desired, the ratio can be increased or decreased accordingly. For example, for a stronger beverage result, the coffee solid level will be above the level of water. Inversely, a weaker beverage will be accomplished by having the water fluid higher than the coffee solid level. Each of these brewing aspects can be easily accomplished by using the pair of vessels according to the present invention and as illustrated in FIGS. 1 through 4.

For example and as shown in FIG. 1, the present invention includes a fluid vessel 6 and a coffee solid vessel 7. The fluid vessel 6 has a vertical height and a fluid volume capacity for holding a fluid. Alternatively, the coffee solid vessel 7 is laterally attached (either permanently attached or detachably attachable (as illustrated)) with the fluid vessel 6. The coffee solid vessel 7 also has a vertical height and an interior that defines a coffee solid volume capacity for holding a solid coffee product. Importantly, each of the fluid vessel 6 and coffee solid vessel 7 are formed such that a desired solid-to-fluid ratio exists between the fluid volume capacity and the coffee solid volume capacity when laterally attached with one another, with the desired solid-to-fluid ratio being maintained along the vertical height of each of the vessels. Thus, a user can fill the fluid vessel 6 with water to any point along the vertical height and fill the coffee solid vessel 7 with solid coffee product such that the solid coffee product is approximately level with the water (i.e., to the same line or marking along the vertical height), and in doing so, establish desired proportions of water and solid coffee product.

Each vessel is made of glass or clear plastic so that the contents of each container can be easily viewed. Thus, it is very simply to merely pour water into the fluid vessel 6 to any desired level, irrespective of the number of ounces or cups of water involved. The preparer of the coffee will then pour solid coffee product (e.g., beans) into the coffee solid vessel 7 until the heights of the coffee beans and the water are the same. The contents of each container may then be placed into the appropriate compartment of the coffee making apparatus, such as pouring the coffee beans into a filter basket and the water into the heatable water chamber for dripping through the beans in the basket.

There is no need for any measurement to provide a uniform strength of successive batches of coffee. The only measurement as required would be in determining the amount of coffee to be made. Obviously, if water is poured into the fluid vessel 6 to its top, twice as much coffee will be made than if the water only reaches the half-way mark on the container. In either case, the level of the coffee beans will be the same as the level of the water so as to maintain the prior bean to water ratio and resulting in the a consistent coffee strength. If desired, either or both vessels may be provided with visible indicia, such as height lines 8 at any desired location or locations along its vertical height. This may be helpful to the preparer if the indicia indicated a different amount of coffee to be made, whether in terms of cups or ounces.

Figures 2, 3:
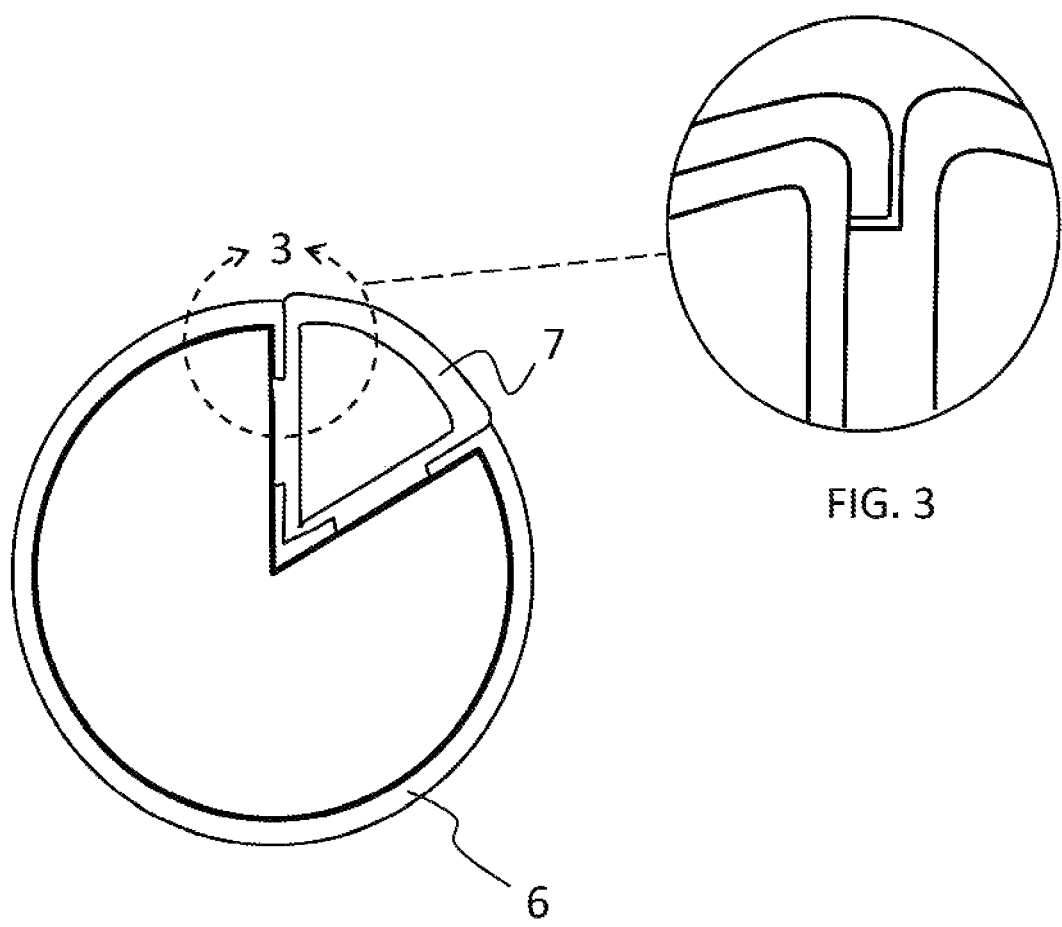
FIG. 2 is a top-view illustration of the vessels depicted in FIG. 1.
FIG. 3 is an enlarged-view illustration of an upper portion of the container indicated as element 3 in FIG. 2.

As can be appreciated, the fluid vessel 6 and coffee solid vessel 7 can be formed in any suitable shape so long as the desired solid-to-fluid ratio exists between the fluid volume capacity and the coffee solid volume capacity when laterally attached with one another. A non-limiting example of such a shape is depicted in FIGS. 1 through 3. As shown in FIG. 1, the fluid vessel 6 is of a generally cylindrical shape. In this non-limiting aspect, the fluid vessel 6 has a pie or wedge-shaped cut-out along its vertical length. The fluid vessel 6 also has an open top through which water may be introduced or removed from the container. A smaller open top coffee solid vessel 7 is provided having the same general height as the fluid vessel 6.

In the non-limiting example as depicted in FIG. 1, each of the vessels have walls that rise vertically from a bottom plane. In this aspect, the desired solid-to-fluid ratio can be maintained by forming each of the vessels such that they have cross-sectional areas that are reflective of the desired solid-to-fluid ratio. For example, if the desired solid-to-fluid ratio is 1:6, then the cross-sectional area of the coffee solid vessel 7 will be one-sixth of the cross-sectional area of fluid vessel 6.

As noted above, the fluid vessel 6 and coffee solid vessel 7 can be formed such that they are detachably attachable with one another. For example and as depicted in FIGS. 1 through 3, the coffee solid vessel 7 is formed in a pie or wedge-shaped cross-sectional configuration so that it is a complimentary shape as the cut-out of the fluid vessel 6. Thus, due to the wedge-shaped cross-section, the coffee solid vessel 7 can matingly engage with the fluid vessel 7 by fitting within the pie-shape cut-out of the fluid vessel 7. If desired, the two vessels may be reliably secured together using any mechanism or device, such as a strap or one or more clips.

Figure 4:
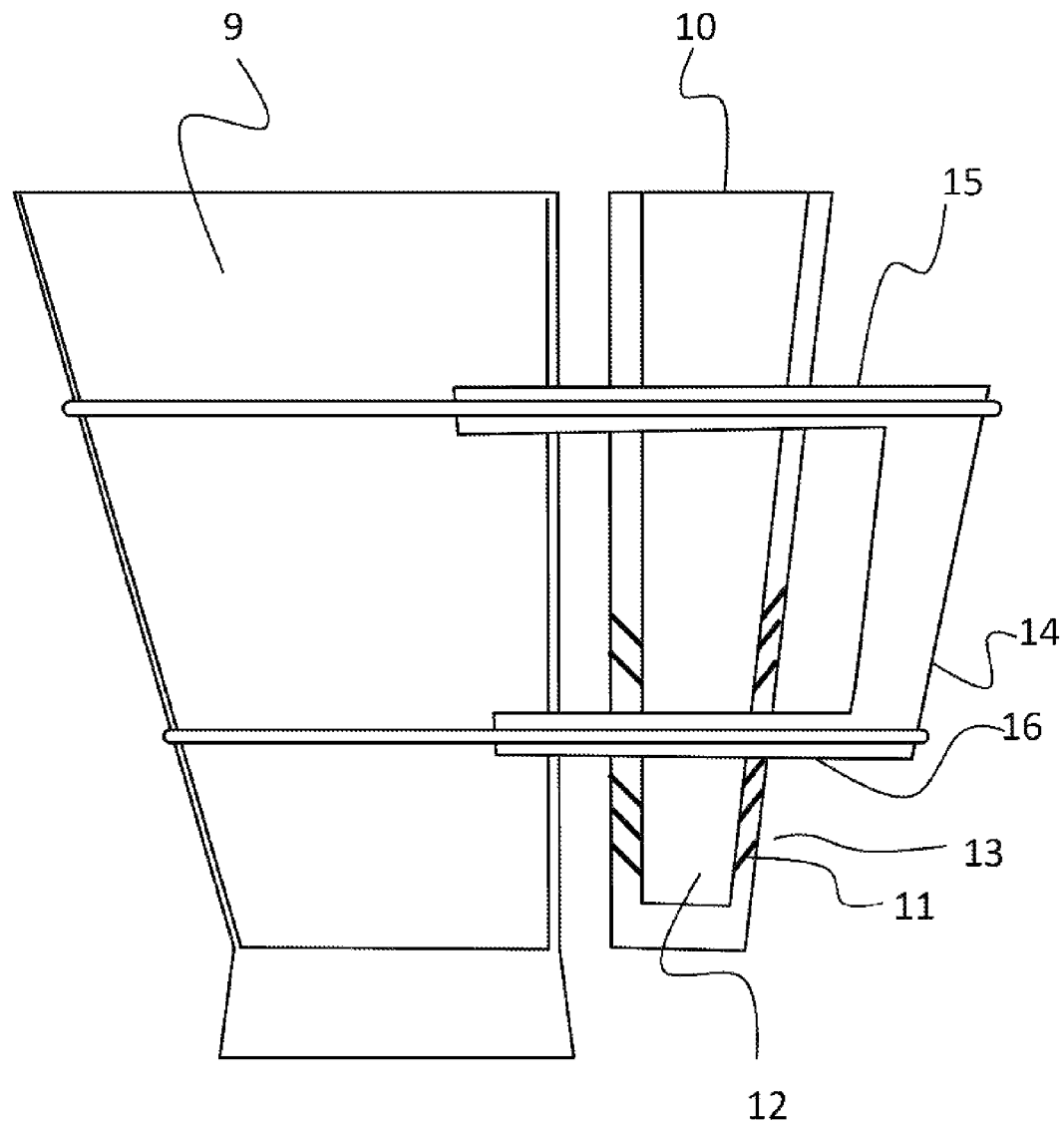
FIG. 4 is a side-view illustration of another aspect of the fluid vessel and coffee solid vessel according to the present invention.

Another example is depicted in FIG. 4, which is a side-view illustration of a fluid vessel 9 and coffee solid vessel 10. In this example, each of the fluid vessel 9 and coffee solid vessel 10 are formed in the shape of a frustrum. In other words, each of the fluid vessel 9 and coffee solid vessel 10 are conically shaped, with a horizontally truncated end (i.e., a flat end that does not come to a point). Importantly and as similarly noted with respect to the aspects depicted in FIGS. 1 through 3, of the fluid vessel 9 and coffee solid vessel 10 are formed such that a desired solid-to-fluid ratio exists between the fluid volume capacity and the coffee solid volume capacity when laterally attached with one another, with the desired solid-to-fluid ratio being maintained along the vertical height of each of the vessels. For example, if the desired solid-to-fluid ratio is 1:6, then each of the coffee solid vessel 10 and fluid vessel 9 are formed such that a ratio of one to six exists between the coffee solid volume capacity and fluid volume capacity at any and all points as measured along the vertical height of each vessel.

To prevent fluids (such as water or other fluids) from being contained in the coffee solid vessel 10, the coffee solid vessel 10 includes a drain 11 formed therethrough to allow fluid to drain from said coffee solid vessel 10. The drain 11 is any suitable perforation that allows fluid to drain from the coffee solid vessel 10, a non-limiting example of which includes a simple hole at the bottom of the vessel 10. As another non-limiting example, the drain 11 includes a series of perforations formed through the coffee solid vessel 10 that are formed at upward slanting angles. The perforations pass upward through the walls from the interior 12 of the coffee solid vessel 10 to an exterior 13 of the coffee solid vessel 10. Thus, due to the upward slanting angles, coffee solid positioned within the coffee solid vessel 10 is maintained therein, while fluid is allowed to escape through the perforations. Importantly, the drain 11 is included for the purpose of assuring that the coffee solid vessel 10 can only be used for the measurement of solids (as liquids would readily drain therefrom).

Figure 5:
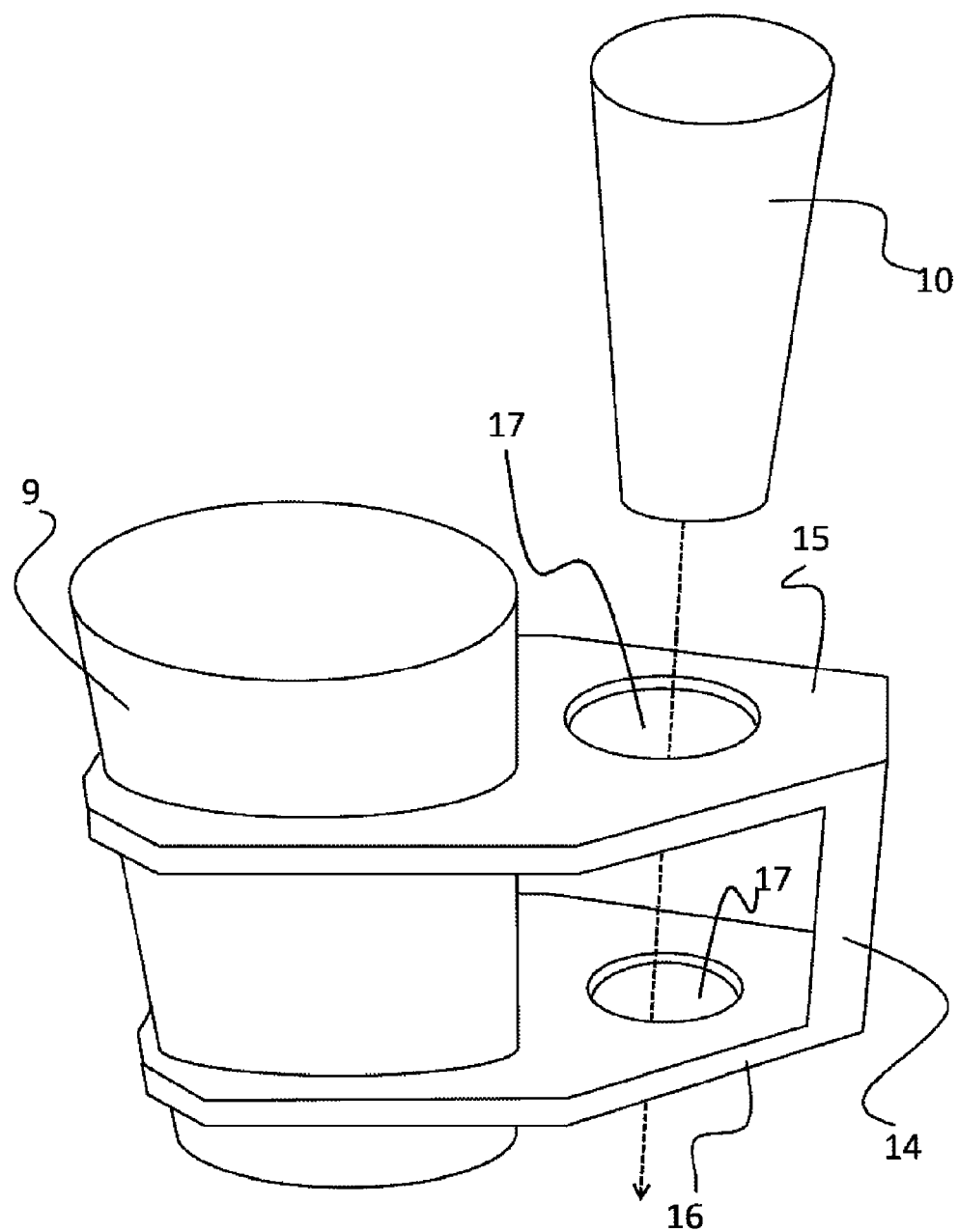
FIG. 5 is a perspective-view illustration of the fluid vessel as shown in FIG. 4, with the coffee solid vessel removed therefrom.

As noted above, the coffee solid vessel 10 can be formed such that it is detachably attached with the fluid vessel 9 through any suitable mechanism or technique. As a non-limiting example and as depicted in FIG. 5, a handle 14 extends from the fluid vessel 9. The handle 14 has an upper platform 15 and a lower platform 16. Each of the upper platform 15 and lower platform 16 have a hole 17 formed therethrough. The holes 17 are formed to accommodate the coffee solid vessel 10 therein, thereby allowing a user to position the coffee solid vessel 10 within the holes 17 and attach the coffee solid vessel 10 with the fluid vessel 9. Once attached, the user can fill the fluid vessel 9 with water and the coffee solid vessel 10 with solid coffee product (e.g., ground coffee) to a similar point along the vertical height of each vessel. In doing so, the desired proportions of water and coffee beans will be generated. Thereafter, the user can remove the coffee solid vessel 10 to provide the beans to a coffee maker and pour the fluid from the fluid vessel 9 into the coffee maker to make the coffee.

What is claimed is:

1. A measuring device for establishing desired proportions of water and coffee beans, comprising:
 a fluid vessel, the fluid vessel having vertical height and a fluid volume capacity, with the fluid vessel being formed to hold water therein;
 a coffee solid vessel laterally attached with the fluid vessel, the coffee solid vessel having vertical height and an interior that defines a coffee solid volume capacity, with the coffee solid vessel being formed to hold a solid coffee product therein;
 wherein each of the fluid vessel and coffee solid vessel are formed such that a desired solid-to-fluid ratio exists between the fluid volume capacity and the coffee solid volume capacity when laterally attached with one another, with the desired solid-to-fluid ratio being maintained along the vertical height of each of the vessels, whereby a user can fill the fluid vessel with water to any point along the vertical height and fill the coffee solid vessel with solid coffee product such that the solid coffee product is approximately level with the water, and in doing so, establish desired proportions of water and solid coffee product;

wherein coffee solid volume capacity is approximately one sixth the fluid volume capacity, such that a ratio of one to six exists between the coffee solid volume capacity and fluid volume capacity at any and all points along the vertical height; and wherein the coffee solid vessel includes a drain formed therethrough to allow fluid in the coffee solid vessel to drain therefrom, and wherein the coffee solid vessel includes a top half and a bottom half, and wherein at least a portion of the drain is formed in the bottom half, whereby due to the drain, coffee solid positioned within the coffee solid vessel is maintained therein, while fluid is allowed to drain through the drain.

2. The device as set forth in claim 1, wherein the drain includes a series of perforations formed through the coffee solid vessel, the series of perforations are formed at upward slanting angles such that the perforations pass upward from the interior of the coffee solid vessel to an exterior of the coffee solid vessel, whereby due to the upward slanting angles, coffee solid positioned within the coffee solid vessel is maintained therein, while fluid is allowed to escape through the perforations.

3. The device as set forth in claim 2, wherein the coffee solid vessel is detachably attached with the fluid vessel.

4. The device as set forth in claim 3, wherein a handle extends from the fluid vessel, the handle having an upper platform and a lower platform, and wherein each of the upper platform and lower platform have a hole formed therethrough, the holes formed to accommodate the coffee solid vessel therein, thereby allowing a user to position the coffee solid vessel within the holes and attach the coffee solid vessel with the fluid vessel.

5. The device as set forth in claim 4, wherein each of the coffee solid vessel and fluid vessel are formed in a frustrum shape.

6. The device as set forth in claim 3, wherein the fluid vessel is generally cylindrically shaped, with a pie-shape cut-out along its vertical length, and wherein the coffee solid vessel is formed to have a wedge-shaped cross section that allows the coffee solid vessel to matingly engage with the fluid vessel by fitting within the pie-shape cut-out of the fluid vessel.

7. A measuring device for establishing desired proportions of water and coffee beans, comprising:

a fluid vessel, the fluid vessel having vertical height and a fluid volume capacity, with the fluid vessel being formed to hold water therein;

a coffee solid vessel laterally attached with the fluid vessel, the coffee solid vessel having vertical height and an interior that defines a coffee solid volume capacity, with the coffee solid vessel being formed to hold a solid coffee product therein;

wherein each of the fluid vessel and coffee solid vessel are formed such that a desired solid-to-fluid ratio exists between the fluid volume capacity and the coffee solid volume capacity when laterally attached with one another, with the desired solid-to-fluid ratio being maintained along the vertical height of each of the vessels, whereby a user can fill the fluid vessel with water to any point along the vertical height and fill the coffee solid vessel with solid coffee product such that the solid coffee product is approximately level with the water, and in doing so, establish desired proportions of water and solid coffee product; and wherein the coffee solid vessel includes a drain formed therethrough to allow fluid in the coffee solid vessel to drain therefrom, and wherein the coffee solid vessel includes a top half and a bottom half and wherein at least a portion of the drain is formed in the bottom half, whereby due to the drain, coffee solid positioned within the coffee solid vessel is maintained therein, while fluid is allowed to drain through the drain.

8. The device as set forth in claim 7, wherein the drain includes a series of perforations formed through the coffee solid vessel, the series of perforations are formed at upward slanting angles such that the perforations pass upward from the interior of the coffee solid vessel to an exterior of the coffee solid vessel, whereby due to the upward slanting angles, coffee solid positioned within the coffee solid vessel is maintained therein, while fluid is allowed to escape through the perforations.

* * * * *